April 3, 1956 J. RUGAR 2,740,641
TRAILER BODY LOCKING ASSEMBLY
Filed July 20, 1954
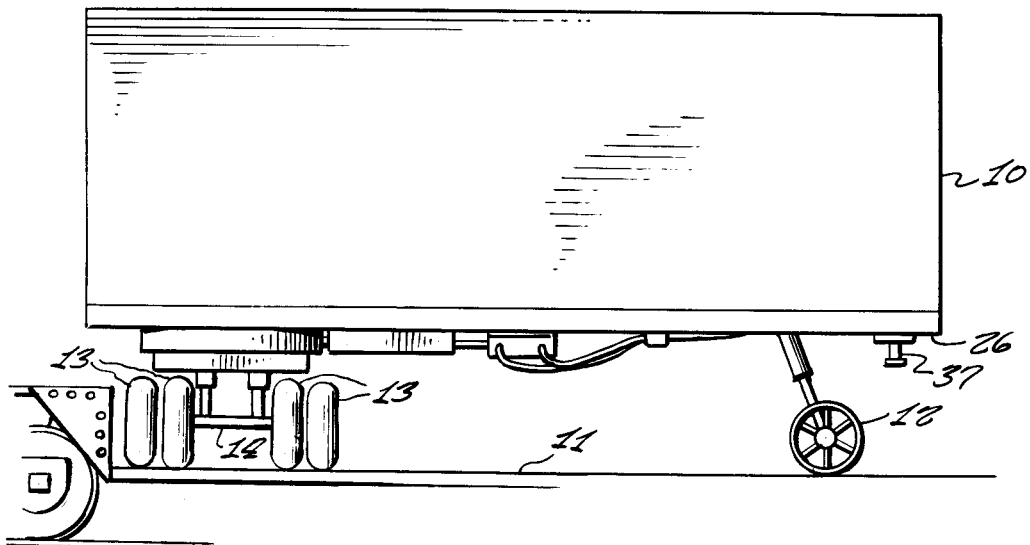
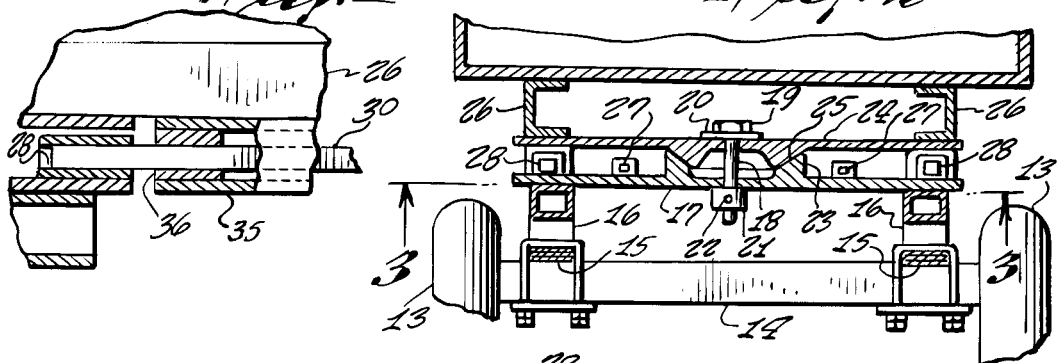
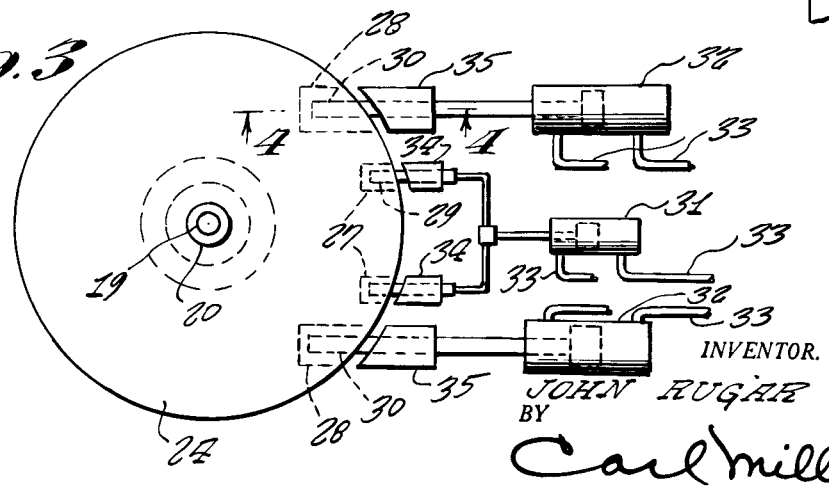
INVENTOR.
JOHN RUGAR
BY
Carl Miller
ATTORNEY

United States Patent Office 2,740,641
Patented Apr. 3, 1956

2,740,641
TRAILER BODY LOCKING ASSEMBLY
John Rugar, Jersey City, N. J.

Application July 20, 1954, Serial No. 444,579

3 Claims. (Cl. 280—131)

This invention relates to automobile and truck trailers and more particularly to trailers having a number of rear wheels mounted on a carriage, said carriage being adapted to swivel around a vertical axis.

An object of the present invention is to provide an improved type of truck trailer body, of simple and durable design and which can be marketed at a comparatively cheap price.

Another object of this invention is to provide a truck trailer body which can be rapidly loaded on and unloaded from railroad cars with a minimum of time and effort.

A further object of this invention is to provide a suitable locking mechanism for fixing the position of the rear wheel carriage of a trailer body once the said trailer body has been located in position on a railroad flat car.

A still further object of the present invention is to provide an improved method for loading and unloading trailer bodies of the type mentioned on and from railroad flat cars of the kind having a depressed center portion.

Other and more specific objects of the present invention will be apparent from the following description as read in connection with the accompanying drawing, the novel features of this invention being pointed out in the claims at the end of the specification.

Fig. 1 is a side view of a trailer body incorporating the invention;

Fig. 2 is a vertical cross-sectional view of the rear wheel carriage of the said trailer body taken through the vertical axis of said carriage and showing fragmentary views of a number of the rear wheels;

Fig. 3 is a cross-sectional view taken about the line 3—3 of Fig. 2 and looking in the direction of the arrows located at the ends of the said line 3—3.

Fig. 4 is a cross-sectional view taken about the line 4—4 of Fig. 3 and looking in the direction of the arrows located at the ends of the said line 4—4.

The present invention has been conceived with a view towards facilitating the transportation of automobile and truck trailer bodies by railroad cars of the conventional flat car design or of the type having a relatively low central portion. That railroad transportation of trailer bodies possesses many advantages is well known for it is obvious, from a consideration of local traffic conditions and the distribution of railroad facilities, that such transportation is capable of effecting substantial economies in terms of both time and money.

However, in accomplishing such transportation, great inconvenience and delay may be involved in loading and unloading operations due to the fact that conventional trailer bodies are frequently not adapted for movement on and off the usual type of railroad flat car. The present invention remedies this difficulty by providing a trailer body capable of great maneuverability with respect to positioning same on railroad flat cars and in particular with respect to railroad flat cars having a low central portion.

Referring in detail to the drawing, the embodiment of the invention therein shown is a trailer body 10 mounted in transportable position on the low central portion 11 of a railroad flat car incorporating this feature. The said trailer body 10 has a single front wheel 12 of the swivel type, it being understood, however, that the present invention does not limit itself to trailer bodies having single front wheels, but may also be applied to other conventional types of trailer bodies. The rear wheels 13 of the said trailer body 10 are mounted on an axle 14, the latter being connected by springs 15 through spring hangars 16 to a circular steel plate 17 mounted on a centrally located pivot 18. The said pivot 18 may consist of a bolt 19, seated on a washer 20 and held in position by a nut 21 affixed to the lower end of the said bolt 19 by a pin 22.

The said circular steel plate 17 incorporates an upright stiffening section 23 which also serves to separate the said circular plate 17 from a second circular steel plate 24 located above the first mentioned circular plate 17. The said lower circular plate 17 is rotatable about the said pivot 18, the said circular plate 17 maintaining a bearing contact surface 25 with the upper circular plate 24, which surface may be supplied with an appropriate lubricant. The said upper circular plate 24 is affixed to two longitudinal steel channels 26 by conventional means. The said channels 26 are also affixed to the trailer body 10 and extend the entire length thereof.

Located between the above-mentioned circular plates 17 and 24 are four receptacles 27 and 28 adapted to receiving four locking pins 29 and 30, the said pins being capable of movement into or withdrawal from the said receptacles 27 and 28 due to the action of three hydraulic or air-driven cylinders 31 and 32 which receive a quantity of hydraulic fluid or air through a number of contduits 33 from an outside source (not shown) said conduits 33 also being capable of discharging said hydraulic fluid or air. The above named receptacles 28 also serve to separate the circular plates 17 and 24 from each other in the area near their peripheries. Moreover, the said receptacles 28 are affixed to the upper surface of the lower circular plate 17 but are movable with respect to the lower surface of the upper circular plate 24, appropriate lubrication being provided between such movable surfaces.

The said locking pins 29 and 30 are equipped with brake members 34 and 35 located in the vicinity of the peripheral edges of the circular plates 17 and 24, said brake members 34 and 35 being movable with said locking pins 29 and 30 to a position in contact with said peripheral edges of the said plates 17 and 24 so as to exert a substantial frictional force in opposition to any motion of the lower plate 17 relative to the upper plate 24.

It is to be noted that the pins 30 are affixed to the said brake members 35 by means of hollow cylindrical members 36 which are permanently secured to both the brake members 35 and the said pins 30.

The loading and unloading operations of the above-described trailer body on and off a railroad flat car is rapid and efficient. These operations are preferably performed in connection with a railroad flat car of the low central portion type hereinbefore mentioned.

In loading the trailer in question, the railroad car is moved to a siding in proximity to a platform or ramp of a height substantially the same as that of the said low central portion 11. Then the trailer body 10 is backed on to the flat car and the aforementioned locking pins 29 and 30 are withdrawn from their receptacles 27 and 28 by the application within the cylinders 31 and 32 of compressed air or hydraulic fluid arising from a source within the said trailer body 10 or automotive means used for backing same, and the trailer body 10 is rotated ninety degrees into longitudinal alignment with the railroad car. Then the locking pins 29 and 30 may be driven forward by the air or hydraulic cylinders 31 and 32 so that the brake members 34 and 35 will engage the edges of the said plates 17 and 24 in a position ninety degrees (approximately) from the said receptacles 27 and 28. The automotive means are then uncoupled from the trailer body 10 by disengaging the coupling means 37 and the said trailer body 10 is fastened by conventional means to the railroad car. It is to be noted that a railroad car having a low central portion is preferred in the transportation of the said trailer body 10 both because of the ease of loading and unloading and because of the inherent stability of said car and trailer body 10 arising as a result of the low center of gravity. The said car and trailer body 10 also possess a low overall height thus eliminating many routing problems.

Unloading the trailer body is accomplished by simply reversing the procedure described above. Here automotive means is first coupled to the trailer body 10 after unfastening any means holding the said trailer body 10 in position on the flat car. Then the locking pins 29 and 30 are withdrawn from receptacles 27 and 28 by the cylinders 31 and 32 and the trailer body 10 is rotated ninety degrees by said automotive means. The locking pins 29 and 30 are driven into their receptacles as the trailer body 10 and automotive means are driven away by way of a platform of suitable height adjacent to the flat car.

The embodiments of the invention illustrated and described hereinabove have been selected for the purpose of clearly setting forth the principles involved. It will be apparent, however, that the present invention is susceptible of being modified in respect to details of construction, combination and arrangement of parts which may be resorted to without departure from the spirit and scope of the invention as claimed.

Having thus described my invention, I claim:

1. An improved type of trailer comprising in combination a truck trailer body having at least one wheel at its forward portion, horizontal rotatable means affixed to the rearward portion of the said trailer body by mounting means, a plurality of turnable wheels movably attached to said rotatable means and fluid-driven locking means mounted on said trailer body and cooperating with the said rotatable means to hold the said rotatable means in a fixed position when the said locking means is in an engaged position with the said rotatable means and to allow said rotatable means to turn freely when said locking means is in a disengaged position from said rotatable means, said horizontally rotatable means comprising in combination at least one axle suitable for engagement with said wheels, a plurality of springs affixed to said axle, a relatively low circular steel plate located on the longitudinal axis of the said truck trailer body and having a plurality of spring hangers permanently affixed to the said steel plate and cooperating with the said springs to support the said circular steel plate in a horizontal position, said relatively low circular plate having an upright stiffening section integral therewith, said mounting means comprising a horizontal relatively high circular steel plate permanently affixed to the said truck trailer body by a plurality of longitudinal steel members, said relatively high circular plate having a stiffening section integral therewith, said stiffening section being in movable contact with the stiffening section of the said relatively low circular plate, and a vertical steel pivot passing through the centers of the said relatively high and relatively low circular plates and being movably affixed within said plates, said relatively low circular plate having a plurality of horizontal receptacles permanently affixed to its upper surface in the vicinity of the peripheral edge of the said relatively low circular plate and disposed to be engaged with and to be disengaged from the said locking means, said receptacles being in movable contact with the relatively high circular plate, said relatively low circular plate being rotatable with respect to said relatively high circular plate when said locking means are disengaged from said receptacles, said relatively low circular plate being in a fixed position relative to the said relatively high circular plate when said locking means are engaged with the said receptacles.

2. An improved type of trailer comprising in combination a truck trailer body having at least one wheel at its forward portion, horizontal rotatable means affixed to the rearward portion of the said trailer body by mounting means, a plurality of turnable wheels movably attached to said rotatable means and fluid-driven locking means mounted on said trailer body and cooperating with the said rotatable means to hold the said rotatable means in a fixed position when the said locking means is in an engaged position with the said rotatable means and to allow said rotatable means to turn freely when said locking means is in a diengaged position from said rotatable means, said locking means comprising at least one pin, a brake member permanently affixed to the said pin and adapted to simultaneously exert a substantial pressure upon the peripheral edge of the said rotatable means and the said mounting means when in contact with the said rotatable and mounting means, an air cylinder affixed on the said trailer body and engaging said pin, the said pin projecting axially from the said cylinder and being movable in a horizontal forward and reverse direction with respect to said cylinder, said pin and brake member engaging the said rotatable means when the said pin is moved in a forward direction and disengaging from said rotatable means when the said pin is moved in a reverse direction, and a source of compressed air connected by two conduits to the interior of the said cylinder and cooperating therewith to effect movement of the said pin in the said forward and reverse directions.

3. An improved type of trailer comprising in combination a truck trailer body having at least one wheel at its forward portion, horizontal rotatable means affixed to the rearward portion of the said trailer body by mounting means, a plurality of turnable wheels movably attached to said rotatable means and fluid-driven locking means mounted on said trailer body and cooperating with the said rotatable means to hold the said rotatable means in a fixed position when the said locking means is in an engaged position with the said rotatable means and to allow said rotatable means to turn freely when said locking means is in a diengaged position from said rotatable means, said horizontally rotatable means comprising in combination at least one axle suitable for engagement with said wheels, a plurality of springs affixed to said axle, a relatively low circular steel plate located on the longitudinal axis of the said truck trailer body and having a plurality of spring hangers permanently affixed to the said steel plate and cooperating with the said springs to support the said circular steel plate in a horizontal position, said relatively low circular plate having an upright stiffening section integral therewith, said mounting means comprising a horizontal relatively high circular steel plate immovably affixed to the said truck trailer body by a plurality of longitudinal steel members, said relatively high circular plate having a stiffening section integral therewith, said stiffening section being in movable contact with the stiffening section of the said relatively low circular plate, and a vertical steel pivot passing through the centers of the said relatively high and relatively low circular plates and being movably affixed within said plates, said relatively low circular plate having a plurality of horizontal receptacles permanently affixed to its upper surface in the vicinity of the peripheral edge of the said relatively low circular plate and disposed to be engaged with and to be disengaged from said locking means when the said axle is in a position transverse to the longitudinal axis of the said truck trailer body, said receptacles being in movable contact with the relatively high circular plate, said relatively low circular plate being rotatable with respect to said relatively high circular plate when said locking means are disengaged from said receptacles, said relatively low circular plate being in a fixed position relative to the said relatively high circular plate when said locking means are engaged with said receptacles, said locking means comprising at least one pin, a brake member permanently affixed to the said pin and adapted to simultaneously exert a substantial pressure upon the peripheral edges of the said relatively low circular plate and the said relatively high circular plate when in contact with said plates, an air cylinder affixed on the said trailer body and engaging said pin, the said pin projecting axially from the said cylinder and being movable in a horizontal forward and reverse direction with respect to said cylinder, said pin and brake member engaging the said relatively low circular plate when the said pin is moved in a forward direction into the interior of the said receptacles and disengaging from said relatively low circular plate when the said pin is moved in a reverse direction out of the interior of the said receptacles, the said receptacles then being in the vicinity of the said pin and brake member, the said brake member also engaging the relatively low circular plate when the said pin is moved in a forward direction and disengaging from the relatively low circular plate when the said pin is moved in a reverse direction, when the said receptacles are rotated away from the vicinity of the said pin and brake member, and a source of compressed air connected by two conduits to the interior of the said cylinder and cooperating therewith to effect movement of the said pin in the said forward and reverse directions.

References Cited in the file of this patent

UNITED STATES PATENTS

| | | |
|---|---|---|
| 1,734,303 | Ross | Nov. 5, 1929 |
| 1,611,889 | Clement | Dec. 28, 1926 |
| 2,621,055 | O'Kelley | Dec. 9, 1952 |